United States Patent [19]

McNamara

[11] 4,423,643
[45] Jan. 3, 1984

[54] GEAR RETAINER

[75] Inventor: Thomas V. McNamara, Kalamazoo, Mich.

[73] Assignee: Eaton Corporation, Cleveland, Ohio

[21] Appl. No.: 361,283

[22] Filed: Mar. 24, 1982

[51] Int. Cl.³ .......................... F16H 3/08; F16H 57/00
[52] U.S. Cl. .......................................... 74/331; 74/410
[58] Field of Search ................. 74/331, 325, 333, 339, 74/410, 392, 395, 396, 397, 398, 399

[56] References Cited

U.S. PATENT DOCUMENTS

| | | | |
|---|---|---|---|
| 3,105,395 | 10/1963 | Perkins | 74/410 |
| 3,237,472 | 3/1966 | Perkins et al. | 74/410 |
| 3,283,613 | 11/1966 | Perkins | 74/396 |
| 3,335,616 | 8/1967 | Perkins | 74/410 |
| 3,600,962 | 8/1971 | Ivanchich | 74/331 |
| 3,648,546 | 3/1972 | McNamara et al. | 74/333 |
| 3,802,293 | 4/1974 | Winckler et al. | 74/331 |
| 3,943,780 | 3/1976 | Klaue | 74/395 |
| 4,034,620 | 7/1977 | McNamara et al. | 74/325 |
| 4,104,928 | 8/1978 | Vandervoort | 74/410 |
| 4,132,122 | 1/1979 | Richards | 74/339 |
| 4,152,949 | 5/1979 | Vandervoort et al. | 74/331 |
| 4,269,077 | 5/1981 | Vandervoort | 74/331 |

*Primary Examiner*—Lawrence J. Staab
*Assistant Examiner*—Michael D. Bednarek
*Attorney, Agent, or Firm*—C. H. Grace; H. D. Gordon

[57] ABSTRACT

An improved mainshaft gear retainer assembly (66, 68) for a multiple countershaft (18, 18A) transmission (10) having at least one pair of floating mainshaft gears (44-46, 48-50) positioned axially close together in groups of two and clutchable to a mainshaft (40) one at a time by positive clutches (54, 56, 58) is provided. The improved mainshaft gear retainer assembly prevents axial movement of the two closely positioned gears and reacts the axial forces on a clutched one of the mainshaft gears toward and away from the other mainshaft gear to the mainshaft by means of thrust surfaces (46D—82B,82C—78C, 78D—74B, 74C—70, 94B—82C or 82B—84) which are all rotating, or tending to rotate, at the same speed as the clutched mainshaft gear and the mainshaft. The gear retainer comprises relatively simple components and allows easy assembly and disassembly of the mainshaft gears and gear retainers from the mainshaft. Each of the closely spaced mainshaft gears and certain associated retainer components defines a subassembly (44, 76 and 90) and (46, 82 and 94) which is independently assembled to and removed from the mainhaft assembly (20). The improved retainer assembly components are all received in the circumferential space defined by the root diameter (42A) of the mainshaft splines (42) and the root diameter (44B and 46B) of the gear internal clutch teeth (44A and 46A).

7 Claims, 4 Drawing Figures

GEAR RETAINER

BACKGROUND OF THE INVENTION

1. Field of the Invention

The present invention relates to gear retainer means and more specifically to mainshaft gear retainer means for a transmission having a plurality of substantially identical countershafts and at least one pair of closely axially spaced radially floating mainshaft gears.

2. Description of the Prior Art

Gear retainer means for pairs of closely axially spaced and radially floating mainshaft gears are known. The prior art devices usually utilized retainer means associated with one of the two closely spaced gears to prevent axial movement of that gear in one direction, movement of that gear in the other direction is usually prevented by the other gear and its associated retainer and vice versa. When the forces tending to move one of the gears are reacted by the other gear and its associated retainer, the forces must cross retainer surfaces rotating at different speeds; this makes the retainer subject to wear and failure.

An improved gear retainer means for pairs of closely spaced and radially floating mainshaft gears is disclosed in U.S. Pat. No. 4,034,620, assigned to the assignee of this invention and hereby incorporated by reference. This disclosed improved gear retainer means utilizes structure whereby the axial forces tending to move one of the closely spaced mainshaft gears relative to the other mainshaft gear cross reaction surfaces which are rotating at the same speed, namely the speed of the mainshaft gear which is clutched to the mainshaft. While this disclosed structure is highly desirable as it tends to minimize wear and failure of the reaction surfaces, this disclosed structure is not entirely satisfactory as the design utilized a somewhat complicated and expensive to manufacture thrust member, utilizes somewhat complicated and expensive to manufacture gear structures and additionally the two closely spaced mainshaft gears are interlocked in a manner making later disassembly thereof difficult and/or impossible.

Another improved gear retainer means for pairs of closely axially spaced mainshaft gears is disclosed in copending U.S. Ser. No. 361,938, filed Mar. 25, 1982 and assigned to the assignee of this invention. While the gear retainer means of this disclosure is highly advantageous as it allows independent assembly and disassembly of each of the gears of the closely spaced pair of gears from the mainshaft assembly, it is not totally satisfactory for certain transmissions as pocket gears are required.

SUMMARY OF THE INVENTION

In accordance with the present invention, an improved gear retainer means is provided for pairs of closely spaced and floating mainshaft gears which will react the forces tending to axially move the clutched mainshaft gear to the mainshaft through surfaces which are rotating at the same speeds, namely the speed of the mainshaft and gear clutched thereto. The improved gear retaining means utilizes components which are relatively simple and inexpensive to manufacture, which have a high degree of interchangeability and which permit relatively easy assembly and disassembly of the mainshaft-mainshaft gear assembly. The retainer means of the present invention are of a relatively small outer diameter and are received entirely in the circumferential space between the root diameter of the mainshaft exterior splines and the root diameter of the mainshaft gear interior clutch teeth (or splines).

Additionally, the retainer means of the present invention isolates most, if not all, of the random contact and associated wear of surfaces rotating at different speeds to surfaces on the relatively inexpensive retainer means components and not on surfaces on the relatively expensive gears.

The above is accomplished by providing thrust members axially fixed to the mainshaft and tending to rotate therewith which thrust members will transfer the axial forces acting on the clutched gear to the mainshaft while not applying a significant axial load to any surface rotating with the unclutched one of the closely spaced mainshaft gear pair. Additionally, the gear retainer means will permit relative radial floating of the mainshaft gears relative to the mainshaft and will also permit easy assembly and disassembly of the mainshaft gears from the mainshaft.

Accordingly, it is an object of the present invention to provide an improved gear retainer means for closely axially spaced and radially floating mainshaft gears for a transmission having a plurality of substantially identical countershaft assemblies and floating mainshaft gears.

A further object of the present invention is to provide improved gear retainer means for closely spaced and floating mainshaft gears in a transmission having a plurality of substantially identical countershafts wherein the retainer means allow relatively easy assembly and disassembly of the mainshaft gears from the mainshaft.

These and other objects and advantages of the present invention will become apparent from the reading of the detailed description taken in connection with the drawings.

DESCRIPTION OF THE PREFERRED EMBODIMENT

Figure 1:
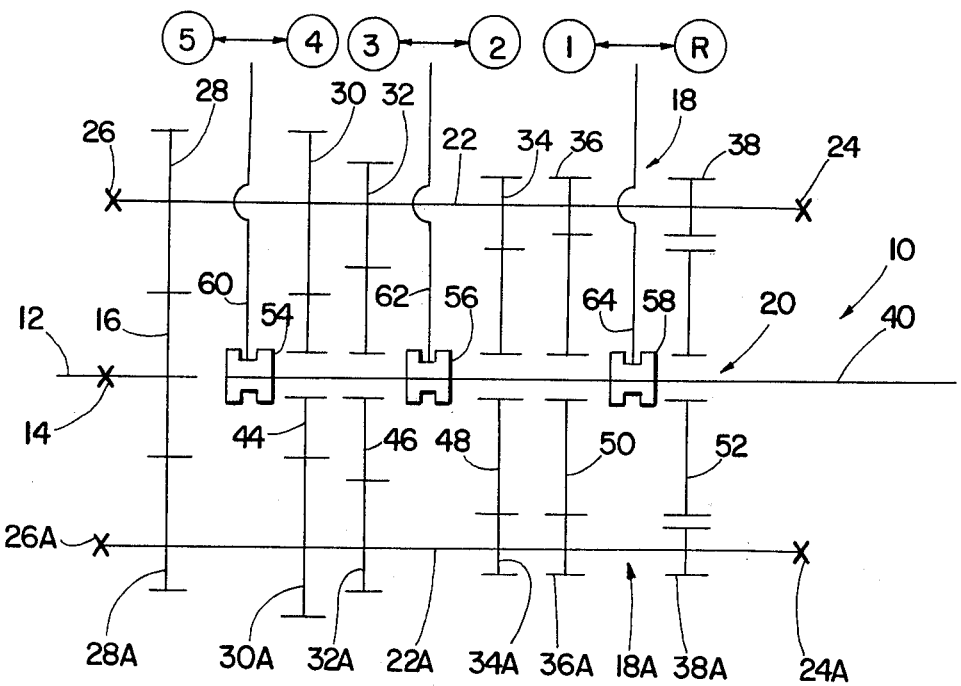
FIG. 1 is a schematic illustration of a five forward speed, single reverse speed twin countershaft, floating mainshaft gear, change gear transmission or main transmission section.

Certain terminology will be used in the following description for convenience in reference only and will not be limiting. The words "upwardly," "downwardly," "rightwardly" and "leftwardly" will designate directions in the drawings to which reference is made. The words "inwardly" and "outwardly" will refer to directions toward and away from, respectively, the geometric center of the device and designated parts thereof. Said terminology will include the words above specifically mentioned, derivatives thereof and words of similar import.

The term "simple transmission" is used to designate a change speed transmission wherein the operator may select one of a plurality of single gear reductions. The term "compound transmission" is used to designate a transmission having a main transmission portion and an auxiliary transmission portion wherein the selected gear reduction in the main transmission portion may be compounded by further selected gear reduction in the auxiliary transmission portion.

Referring now to FIG. 1, there is shown a twin countershaft transmission 10 having a floating mainshaft, floating mainshaft gears and two substantially identical countershaft assemblies. This specific type of transmission is illustrated herein only to provide an environment for the present invention. Specific details of the transmission may be found in U.S. Pat. Nos. 3,105,395; 3,237,472; 3,283,613 and 4,034,620, all of which are hereby incorporated by reference. U.S. Pat. No. 3,237,472 discloses the transmission substantially as shown herein. U.S. Pat. No. 3,283,613 discloses the transmission as the main transmission section of a compound transmission used in combination with an auxiliary transmission section.

Transmission 10 includes a housing (not shown), an input shaft 12 supported by a bearing 14, an input gear 16 driven by the input shaft, a pair of substantially identical countershaft assemblies 18 and 18A, and a floating mainshaft assembly 20.

The countershaft assembly 18 includes a countershaft 22 which is rotatably supported at its left and right ends by bearings 24 and 26. The bearings allow free rotation of the shaft and prevent axial and radial movement thereof relative to the transmission housing as is well known in the prior art. Countershaft assembly 18A includes a countershaft 22A supported in the same manner by bearings 24A and 26A. Each of the countershafts is provided with one of a plurality of gears of identical size and function; these gears are fixed to rotate with their respective countershafts. Gears 28 and 28A are in mesh with the input gear 16, whereby the countershafts rotate at the same speed. Gear pairs 30—30A, 32—32A, 34—34A and 36—36A are forward ratio gears. Gear pair 38—38A are reverse gears.

The floating mainshaft assembly 20 includes a mainshaft 40 having external splines 42 (see FIG. 3) which extend for substantially the full length of the shaft. The right end of shaft 40 may be an output shaft or may provide the input to an auxiliary transmission section if transmission 10 is the main section of a compound transmission. The left end of shaft 40 is supported for rotational and radial movement in any known manner. Further details of the mainshaft mounting arrangement may be obtained from U.S. Pat. Nos. 3,105,395; 3,237,472; 3,283,613 and/or 3,500,695.

Five mainshaft drive gears 44, 46, 48, 50 and 52 encircle the mainshaft 40. Adjacent mainshaft gears 44, 46 and 48, 50 are positioned axially close together to reduce the length of the transmission. The input gear 16 and the mainshaft gears are selectively clutchable to the mainshaft 40, one at a time, by positive clutches 54, 56 and 58 which are slidably connected the mainshaft by internal splines. Each clutch includes clutch teeth or external splines which mate with clutch teeth or internal splines, such as splines 44A, 46A, 48A, and 50A defined by gears 44, 46, 48 and 50, respectively. The sliding clutches are moved into and out of engagement, one at a time, by partially shown shift forks 60, 62 and 64. The construction and manner of operation of the shift forks is well known. Mainshaft gear 44 is constantly meshed with gear pair 30—30A, mainshaft gear 46 is constantly meshed with gear pair 32—32A, mainshaft gear 48 is constantly meshed with gear pair 34—34A, mainshaft gear 50 is constantly meshed with gear pair 36—36A. Mainshaft gear 52 is constantly meshed with a pair of idler gears (not shown) which in turn are constantly meshed with countershaft gear pair 38—38A as is well known to provide a reverse speed mode of operation. The mainshaft drive gears, though encircling the mainshaft 40, are not radially supported thereon. Each gear is radially supported by the pair of countershaft gears (or idler gears) it is in mesh with, i.e. each of the mainshaft drive gears is free to float radially with respect to the mainshaft. The feature of floating the mainshaft and/or its gears provides a nearly equal torque split between the countershaft gears. This feature, which is well known, has greatly improved the wear life of the multiple substantially identical countershaft transmissions.

The mainshaft drive gears, 44, 46, 48, 50 and 52, when clutched to the mainshaft and when under load, are quite often acted on by substantial forces acting along the direction of the mainshaft axis. The precise reasons or causes for the axial forces are not fully understood and the direction of the forces along the axis is not totally predictable. The forces often manifest between the engaged splines of the gear and its clutch. When the forces appear between the splines, they often act in a direction tending to disengage the clutch from the gear splines. However, sometimes the forces act in a direction tending to further engage the clutch with the gear splines. Regardless of where the forces manifest, they tend to move the gear axially along the axis of the mainshaft; hence, gear retainers are needed to react the forces and prevent such movement. However, if the forces are reacted by gear and retainer surfaces rotating at a different speed, the forces cause wear and sometimes premature failure of the surfaces.

Figure 2:
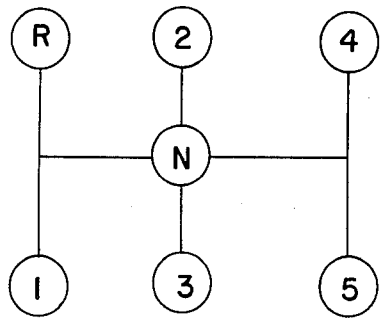
FIG. 2 is a schematic illustration of the shift pattern for the transmission, of transmission section, of FIG. 1.

The shift pattern for the five forward speed one reverse speed transmission 10 illustrated in FIG. 1 may be seen schematically by reference to FIG. 2.

The features and advantages of placing two mainshaft gears close together to reduce transmission length and floating the mainshaft gears to equalize the torque split of the countershaft gear pairs have been recognized for years as significant advancement in the transmission art. However, these advancements have, at the same time, complicated the design of durable gear retainers for preventing axial movement of the closely spaced and radially floating mainshaft gears, since the gear retainers are confined to a relatively small space and at times must react against relatively high axial forces tending to move the gears axially. Certain of the prior art gear retainers have been subject to the problem of wear, overheating and premature failure due to high stresses acting on surfaces rotating at difference speeds. The gear retainer structure illustrated and described in U.S. Pat. No. 4,034,620, previously mentioned, substantially solves the problem of premature wear as all surfaces reacting against relatively high forces will rotate or tend to rotate at the same speed. However, that structure involves relatively complicated retainer means components and once assembled renders disassembly of the closely axially spaced mainshaft gear pair difficult and/or impossible. Hence, if such a structure is utilized, a failure of one gear may result in the requirement that both gears be replaced.

Figure 3:
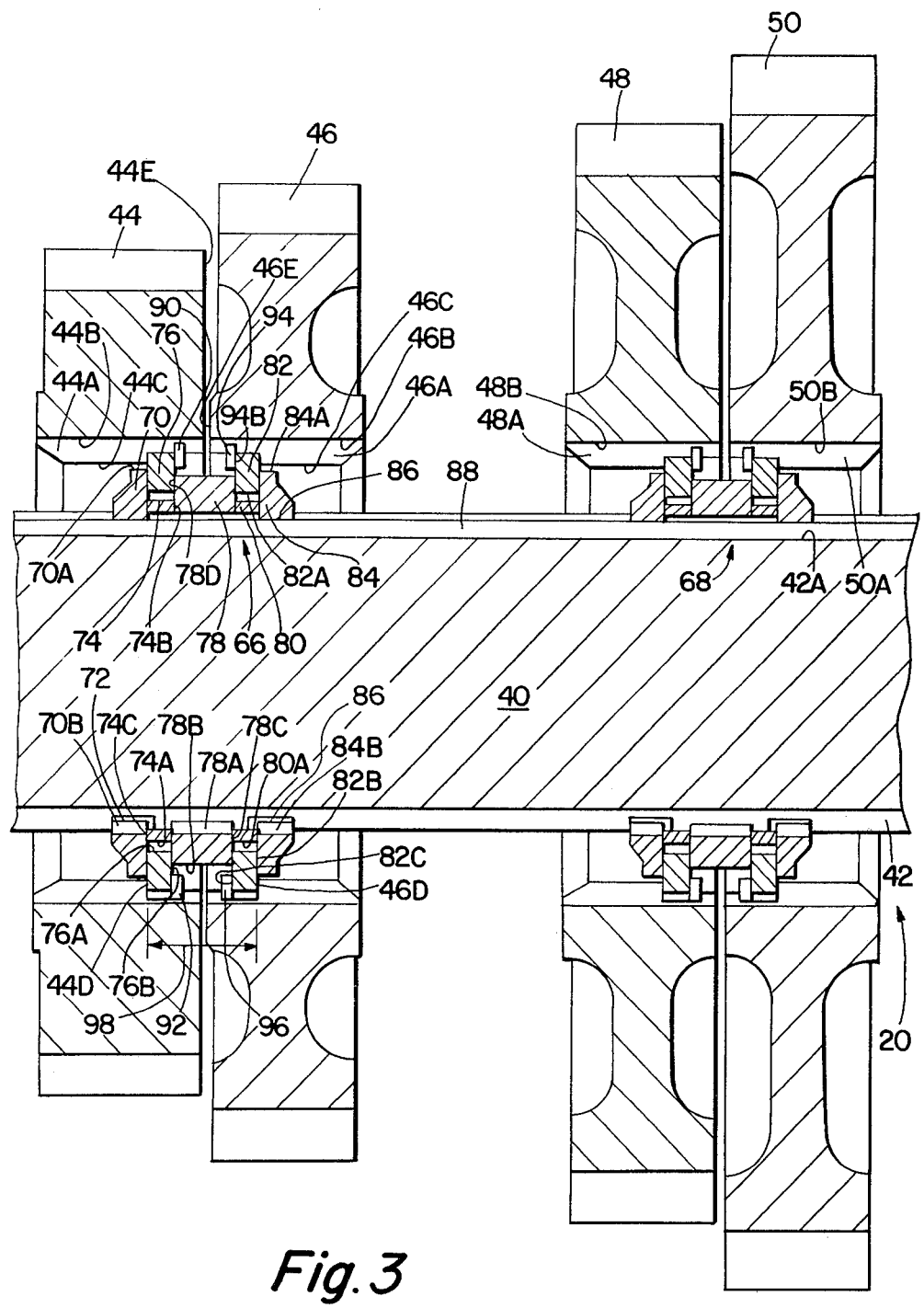
FIG. 3 is a partial sectional view of the mainshaft assembly of the transmission of FIG. 1 illustrating the improved gear retaining means of the present invention.

Looking now at FIG. 3, the mainshaft assembly 20 is illustrated in detail. Mainshaft gear 52 and the sliding clutches 54, 56 and 58 are not illustrated in FIG. 3 for purposes of simplifying the illustration. As may be seen, mainshaft 40 has external splines 42 which may extend along substantially the full length thereof. Mainshaft splines 42 are, of course, substantially parallel to the internal splines 44A, 46A, 48A and 50A defined by the mainshaft gears 44, 46, 48 and 50, respectively, surrounding the mainshaft 40. Mainshaft gears 44 and 46 and mainshaft gears 48 and 50 each comprise a pair of closely axially spaced radially floating mainshaft gears. Gear retainer means 66 axially retains the closely spaced pair of mainshaft gears 44 and 46 relative to mainshaft 40. Gear retainer means 68 axially retains the closely spaced pair of mainshaft gears 48 and 50 relative to mainshaft 40. Gear retainer means 66 and 68 are substantially identical and preferably are formed from common components for ease of manufacturing and inventory, etc.

Internal gear teeth splines 44A, 46A, 48A and 50A define root diameters 44B, 46B, 48B and 50B, respectively. External mainshaft splines 42 define a root diameter 42A. The gear retainer means 66 and 68 are received substantially within the circumferential space defined between the root diameters 44B, 46B, 48B and 50B and root diameter 42A. Preferably, as is illustrated, root diameters 44B, 46B, 48B and 50B are equal or substantially equal.

Retainer means 66 includes external mainshaft washer or snap ring 70 received and axially retained in an annular circumferential groove 72 formed in mainshaft 40, a thrust ring 74 having a relatively small exterior diameter 74A, a mainshaft gear washer 76 having an interior diameter 76A larger than the exterior diameter 74A of thrust ring 74 and telescopically surrounding thrust ring 74, central spacer ring 78, a thrust ring 80 having a relatively small exterior diameter 80A, a mainshaft gear washer 82 having an interior diameter 82A larger than the exterior diameter 80A of thrust ring 80 and telescopically surrounding thrust ring 80, and a mainshaft washer or snap ring 84 received and axially retained in an annular groove 86 formed in mainshaft 40.

Thrust rings 74 and 80 are of a slightly greater axial length, about 0.005 inches greater, than the axial lengths of mainshaft gear washers 76 and 82, respectively. Preferably, central spacer washer 78 is rotationally fixed to mainshaft 40 by means of internal splines 78A for rotation therewith. Preferably, thrust rings 74 and 80 are identical and interchangeable as are mainshaft gear washers 76 and 82. Spacer ring 78 has an outer diameter 78B greater than the inner diameter of mainshaft gear washers 76 and 82. Mainshaft washers 70 and 84 have an outer diameter 70A and 84A, respectively, greater than the inner diameter of mainshaft gear washers 76 and 82, respectively.

Figure 4:
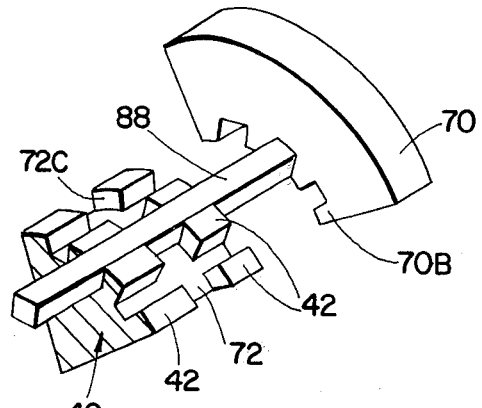
FIG. 4 is a partial exploded view, in perspective, of a portion of the transmission of FIG. 3.

Mainshaft washers 70 and 84, which are preferably identical and interchangeable, are provided with internal splines 70B and 84B, respectively, and are axially locked in grooves 72 and 86, respectively, by means of a key 88. Briefly, as is shown in FIG. 4, the mainshaft washers 70 and 84 internal splines 70B and 84B allow the washers to slide along the mainshaft 40 to the relatively wide circumferential grooves 72 and 86, respectively, formed therein. Grooves 72 and 86 have a width slightly greater than the axial length of internal splines 70B and 84B. The washers are then rotated circumferentially relative to mainshaft 40 by a rotational distance equal to one spline whereby the internal spline teeth of the washers will align with the external spline teeth 42 of the mainshaft. The washers are then locked against rotation relative to the mainshaft by insertion of the key 88. The shoulders 72C and 86C of grooves 72 and 86, respectively, will engage splines 70B and 84B to axially locate washers 70 and 84 on shaft 40. This method of axially retaining washers and the like on splined shafts is well known in the prior art and may be seen by reference to U.S. Pat. No. 4,034,620 mentioned above. Mainshaft washers 70 and 84 may, of course, be replaced by exterior snap rings or the like.

Retainer means 66 also includes an internal snap ring 90 retained in an interior annular groove 92 formed in internal splines 44A of gear 44 and an internal snap ring 94 carried in an interior annular groove 96 formed in internal splines 46A of gear 46. Internal snap ring 90 axially retains mainshaft gear washer 76 axially against a shoulder 44D formed in splines 44A while internal snap ring 94 axially retains mainshaft gear washer 82 axially against shoulder 46D formed in splines 46A.

As may be seen, mainshaft washer 70 retains thrust ring 74, mainshaft gear washer 76, spacer ring 78, mainshaft gear washer 82 and thrust ring 80 against leftward axial movement relative to mainshaft 40 while mainshaft washer 84 retains thrust ring 80, mainshaft gear washer 82, spacer ring 78, mainshaft gear washer 76 and thrust ring 74 against rightward axial movement relative to mainshaft 40.

Spacer ring 78 has an outer diameter 78B which is less than the apex diameters, 44C and 46C, of internal splines 44A and 46A, respectively. Thrust rings 74 and 80 have outer diameters 74A and 80A which are less than the inner diameters 76A and 82A of mainshaft gear washers 76 and 82, respectively. Accordingly, retainer means 66 will not interfere with radially floating movement of the mainshaft gears 44 and 46.

The combined axial width 98 of thrust ring 74, spacer ring 78 and mainshaft gear washer 82 is greater than the sum of the axial separation of shoulder 44D from rightward end face 44E of gear 44 and the axial separation of shoulder 46D from leftward end face 46E of gear 46. Accordingly, opposed end faces 44E and 46E of gears 44 and 46, respectively, will not abut and thus not be subject to wear when rotating at different rotational speeds under load.

The operation of gear retaining means 66, and of gear retaining means 68 which is substantially identical thereto, may be appreciated by consideration of the following example: Assuming, for purposes of illustration, that gear 46 has been clutched to mainshaft 40 by leftward axial movement of sliding clutch 56. When mainshaft gear 46 is so clutched to mainshaft 40, the mainshaft 40, mainshaft gear 46, mainshaft washer 84, thrust ring 80, mainshaft gear washer 82, spacer ring 78, thrust ring 74 and interior snap ring 94 will rotate or tend to rotate at the same rotational speed as the loaded gear 46. It is understood that members are considered to rotate with mainshaft 40 if splined thereto and/or if free to rotate therewith. Interior snap ring 90 and mainshaft gear washer 76 will rotate, or tend to rotate, with mainshaft gear 44. In the event of an axial force tending to the move the clutched gear 46 towards the unclutched gear 44, i.e. a leftwardly directed axial force on gear 46, such an axial force will be reacted to the mainshaft 40 in the following manner: leftwardly facing shoulder 46D of gear 46 will bear upon the rightwardly facing end face 82B of mainshaft gear washer 82 causing the leftwardly facing end face 82C of mainshaft gear washer 82 to bear upon the rightwardly facing end face 78C of spacer ring 78 which will cause the leftwardly facing end face 78D of spacer ring 78 to bear upon the rightwardly facing end face 74B of thrust ring 74 which will result in the leftwardly facing end face 74C of thrust ring 74 bearing on mainshaft washer 70 which will react the forces directly to the mainshaft 40. It may be seen that the axial forces cross various reacting surfaces, namely 46D—82B, 82C—78C, 78D—74B and 74C—70 which are all rotating, or tending to rotate, at the same speed, thus reducing wear on the various components of the gear retaining means and on the gears.

As thrust ring 74 is of a greater axial length than mainshaft gear washer 76, leftwardly facing end face 78D of spacer ring 78 will not transmit any sustained axial force (other than random contact not under axial load) to mainshaft gear washer 76 which is rotating or tending to rotate, with mainshaft gear 44.

In the event of a rightward axial force on gear 46 tending to separate the clutched gear 46 from the unclutched gear 44, such a reaction force is reacted to the mainshaft 40 in the following manner: rightwardly facing end face 94B of internal snap ring 94 will bear against leftwardly facing end face 82C of mainshaft gear washer 82 causing rightwardly facing end face 82B of mainshaft gear washer to bear on the leftwardly facing end face of mainshaft washer 84 which will react the axial force directly to mainshaft 40. It may again be seen that the various force transmitting reacting surfaces, namely, 94B—82C and 82B—84 are rotating, or tending to rotate, at the same rotational speed which is the speed of the mainshaft and the clutched gear. When gear 44 is clutched to mainshaft 40, gear retaining means 66 will react axial forces from gear 44 to mainshaft 40 in a similar manner. Gear retainer 68, which is substantially identical to gear retainer means 66, will react axial forces from the clutched one of gears 48 or 50 to mainshaft 40 in a substantially identical manner and will thus not be described in detail herein.

Spacer ring 78 has an outer diameter 78B which is less than the inner diameter of snap rings 90 and 94. Preferably, the radial clearance between the outer diameter surfaces of spacer washer 78 and the inner diameter surfaces of snap rings 90 and 94, is sufficient to allow radial movement of the mainshaft gears relative to the mainshaft but not sufficient to allow unintended removal of the internal snap rings 90 and 94, such as by popping out of the grooves 92 and 96, respectively, in which they are received due to high axial forces or the like.

It is recognized that various components of the retainer means, such as mainshaft washers 70 and 84, thrust rings 74 and 80 and spacer ring 78 will continuously rotate, or tend to rotate, with the mainshaft 40. Mainshaft gear washer 76 and interior snap ring 90 will rotate, or tend to rotate, with mainshaft gear 44. Mainshaft gear washer 82 and interior snap ring 94 will rotate or tend to rotate with mainshaft gear 46. When torque is being transmitted from input shaft 12 to the mainshaft 40 through one of the selectable power paths (gear ratios), at least one, and often both, of gears 44 and 46 will be rotating at different speeds than mainshaft 40. Accordingly, a degree of random bumping and wear will occur between surfaces rotating at differing speeds. As such bumping or rubbing will not occur under a sustained axial load, the effects thereof will be minimal. However, it is noted that such random wear will occur primarily between surfaces 82C and 78C or between surfaces 78D and 76B which are surfaces on the relatively inexpensive retainer member washer or sleeve-like components, and not surfaces of the relatively expensive gears 44 and 46.

As mentioned, previously, an important feature of the improved gear retaining means 66 and 68 is the relative simplicity of the components thereof. As may be seen, mainshaft washers 70 and 84 are standard external washers and can be replaced by external snap rings while snap rings 90 and 94 are standardly available internal snap rings. Thrust rings 74 and 80 and mainshaft gear washers 76 and 82 can be simply disc or tube shaped washer members. In the preferred embodiment, all thrust rings, mainshaft washers and mainshaft gear washers within a given transmission will be identical. The spacer ring 78 is simply a sleeve or tube shaped member which may or may not be splined.

Another important feature of the improved gear retaining means of the present invention is the ease of assembling and disassembling mainshaft assemblies. To assemble closely spaced mainshaft gears 44 and 46 to mainshaft 40 from the leftward end of mainshaft 40, mainshaft washer 84 is prepositioned in groove 86, a thrust ring 80 is slid rightwardly into contact with mainshaft washer 84, a mainshaft gear washer 82 is preassembled to gear 46 by means of snap ring 94, the gear 46-washer 82-snap ring 94 subassembly is slid rightwardly over external splines 42 until thrust washer 82 engages washer 84, spacer ring 78 is slid rightwardly over mainshaft 40 until it engages ring 80, a thrust ring 74 is slid rightwardly over the splines 42 until it engages spacer ring 78, a mainshaft gear washer 76 is assembled to gear 44 by means of snap ring 90 received in groove 92, the gear 44-washer 78-snap ring 90 subassembly is slid rightwardly over splines 42 until washer 76 engages spacer 78 and then mainshaft washer 70 is positioned in groove 72 and then key 88 is axially slid down one of the splines to complete the assembly operation. To disassemble the gear pair 44 and 46 from mainshaft 40, key 88 is removed, mainshaft washer 70 is removed from groove 72 and slid leftwardly off shaft 40, the mainshaft gear 44-washer 76-snap ring 90 subassembly is slid leftwardly off mainshaft 40, thrust ring 74, spacer 78 and thrust ring 80 are slid leftwardly off mainshaft 40, gear 46-washer 82-snap ring 94 subassembly is slid leftwardly off mainshaft 40 and finally, mainshaft washer 84 may be slid leftwardly off mainshaft 40.

Of course, both the closely spaced pair of mainshaft gears 44—46 and mainshaft gears 48—50 may be assembled and/or disassembled from either end of the mainshaft. Additionally, only one gear of each pair need be removed for servicing purposes and the like.

It may also be seen that both of the gear 44-washer 76-internal snap ring 90 and gear 46-thrust washer 82-internal snap ring 94 subassemblies are assembled to and disassembled from the mainshaft assembly as separate preassembled subassemblies.

The preferred embodiment of the present invention has been disclosed for illustrative purposes. Various modifications and arrangements of parts may be resorted to without departing from the spirit and the scope of the invention as hereinafter claimed.

I claim:

1. Improved gear retainer means for a change gear transmission of the type having a mainshaft with axially extending external splines formed thereon, first and second radially floating mainshaft gears encircling said mainshaft and axially positioned close together, said first mainshaft gear axially spaced from said second mainshaft gear in a first axial direction, said mainshaft gears provided with axially extending internal clutch teeth formed therein, said first mainshaft gear having a first radially extending shoulder formed in the clutch teeth thereof facing in said second axial direction and said second mainshaft gear having a second radially extending shoulder formed in the clutch teeth thereof facing in said first axial direction, a plurality of substantially identical countershafts each having countershaft gears supporting said mainshaft gears and driving said mainshaft gears at different relative rotational speeds, and clutch means selectively operative to clutch said mainshaft gears to said mainshaft one at a time, said improved gear retainer means comprising:

thrust means axially retained to said mainshaft for axially retaining said first and second mainshaft gears relative to said mainshaft and for reacting axial forces on the clutched one of said mainshaft gears toward and away from the other one of said mainshaft gears to said mainshaft through thrust surfaces rotating at the same speed as said mainshaft, said thrust means received in the circumferential space defined by the root diameters of said mainshaft external splines and the root diameters said mainshaft gear clutch teeth, said thrust means comprising:

a first mainshaft washer axially fixed to said mainshaft in at least said first axial direction, said first mainshaft washer having an outer diameter smaller than the apex diameter of said first mainshaft gear clutch teeth;

a first thrust ring axially abutting said first mainshaft washer in the said first axial direction, said first thrust ring having an outer diameter smaller than the outer diameter of said first mainshaft washer;

a first mainshaft gear washer axially abutting said first shoulder in the said first axial direction, said first mainshaft gear washer having an inner diameter greater than the outer diameter of said first thrust ring and less than the outer diameter of said first mainshaft washer, said first mainshaft gear washer telescopically surrounding said first thrust ring and having an axial length slightly less than the axial length of said first thrust ring;

means to axially retain said first mainshaft gear washer axially abutting said first shoulder, a spacer axially abutting said first thrust ring in said first axial direction, said spacer having an outer diameter greater than the inner diameter of said first mainshaft gear washer and less than the apex diameter of said first mainshaft gear clutch teeth;

a second thrust ring axially abutting said spacer in the said first axial direction, said second thrust ring having an outer diameter smaller than the outer diameter of said spacer;

a second mainshaft gear washer axially abutting said second shoulder in the said second axial direction, said second mainshaft gear washer having an inner diameter greater than the outer diameter of said second thrust ring and less than the outer diameter of said spacer, said second mainshaft gear washer telescopically surrounding said second thrust ring and having an axial length slightly less than the axial length of said second thrust ring;

means to axially retain said second mainshaft gear washer axially abutting said second shoulder; and a second mainshaft washer axially fixed to said mainshaft in at least said second axial direction, said second mainshaft washer axially abutting said second thrust ring in said first axial direction, said second mainshaft washer having an outer diameter smaller than the apex diameter of said second mainshaft gear clutch teeth but greater than the inner diameter of said second mainshaft gear washer.

2. The improved gear retainer means of claim 1, wherein said first and second mainshaft washers are substantially identical, said first and second thrust rings are substantially identical and said first and second mainshaft gear washers are substantially identical.

3. The improved gear retainer means of claim 2, wherein said spacer and said first and second mainshaft washers are fixed to said mainshaft for rotation therewith.

4. The improved gear retainer means of claims 1, 2 or 3, wherein said means to axially retain said first mainshaft gear washer comprises a first internal snap ring received in groove provided in the internal clutch teeth of said first mainshaft gear and said means to axially retain said second mainshaft gear washer comprises a second internal snap ring received in a groove provided in the internal clutch teeth of said second mainshaft gear.

5. The transmission of claim 4, wherein said first gear, said first mainshaft gear thrust washer and said first internal snap ring define a first subassembly which may be assembled to and removed from said mainshaft as an independent subassembly and said second gear, said second mainshaft gear washer and said second internal snap ring define a second subassembly which may be assembled to and removed from said mainshaft as an independent subassembly.

6. The gear retaining means of claim 5, wherein said spacer is a tube like structure having an outer diameter slightly less than the nondeformed inner diameter of said internal snap rings whereby said mainshaft gears are free to float radially relative to said mainshaft but said internal snap rings are prevented from inward radial deformation sufficient to disengage said snap rings from the internal grooves when said spacer member is assembled between said thrust rings.

7. The gear retaining means of claim 5 wherein said first mainshaft gear washer is rotationally fixed to said first mainshaft gear and said second mainshaft gear washer is rotationally fixed to said second mainshaft gear.

* * * * *